(12) United States Patent
Bosse et al.

(10) Patent No.: US 12,117,529 B1
(45) Date of Patent: Oct. 15, 2024

(54) DRIFT DETECTION

(71) Applicant: Zoox, Inc., Foster City, CA (US)

(72) Inventors: Michael Carsten Bosse, Templeton, CA (US); Feroze Naina Mohamed Dheen Mohamed Ismail, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 322 days.

(21) Appl. No.: 17/846,874

(22) Filed: Jun. 22, 2022

(51) Int. Cl.
| | |
|---|---|
| *G01S 17/89* | (2020.01) |
| *G01C 21/32* | (2006.01) |
| *G01S 7/497* | (2006.01) |
| *G01S 17/931* | (2020.01) |
| *G05D 1/00* | (2006.01) |

(52) U.S. Cl.
CPC .............. *G01S 17/89* (2013.01); *G01C 21/32* (2013.01); *G01S 7/497* (2013.01); *G01S 17/931* (2020.01); *G05D 1/0274* (2013.01)

(58) Field of Classification Search
CPC .... G05D 1/0274; G01C 21/32; G01S 17/931; G01S 17/89
See application file for complete search history.

(56) References Cited

U.S. PATENT DOCUMENTS 10,444,759 B2   10/2019   Douillard et al.

OTHER PUBLICATIONS

Zhang, Ji, and Sanjiv Singh. "LOAM: Lidar odometry and mapping in real-time." Robotics: Science and systems. vol. 2. No. 9. 2014 (Year: 2014).*
Chen, Pengxin, et al. "Low-drift odometry, mapping and ground segmentation using a backpack LiDAR system." IEEE Robotics and Automation Letters 6.4 (2021): 7285-7292 (Year: 2021).*
Zhang, Ji, and Sanjiv Singh. "Low-drift and real-time lidar odometry and mapping." Autonomous robots 41 (2017): 401-416 (Year: 2017).*

* cited by examiner

*Primary Examiner* — Maurice C Smith
(74) *Attorney, Agent, or Firm* — EIP US LLP

(57) ABSTRACT

Techniques for determining errors or drifts between maps used for updating maps and/or controlling a system which uses the map. In some examples, a first, global, map may be received or determined. Sensor data may then be used to localize a system with respect to the first map and to generate a first trajectory relative to the first map. The sensor data may be used to create a second map and a second trajectory for navigating the system relative to the second map. Differences between the first and second trajectories (or portions thereof), when compared in a common reference frame, may be used as an indication of drift between various processes or errors in the maps and, subsequently, be used for updating the first map and/or controlling the system.

20 Claims, 7 Drawing Sheets

DRIFT DETECTION

BACKGROUND

An autonomous electric vehicle may navigate in an environment based at least in part on a map of said environment. This map may be generated using sensors such as LIDAR sensors, radar, or other imaging sensors. However, errors in the map (e.g., which may be from errors in creating the map, errors in the sensor data used to create the map, changes to the environment, etc.) may create unsafe situations for vehicles that rely on such maps for navigation, especially in complex environments.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
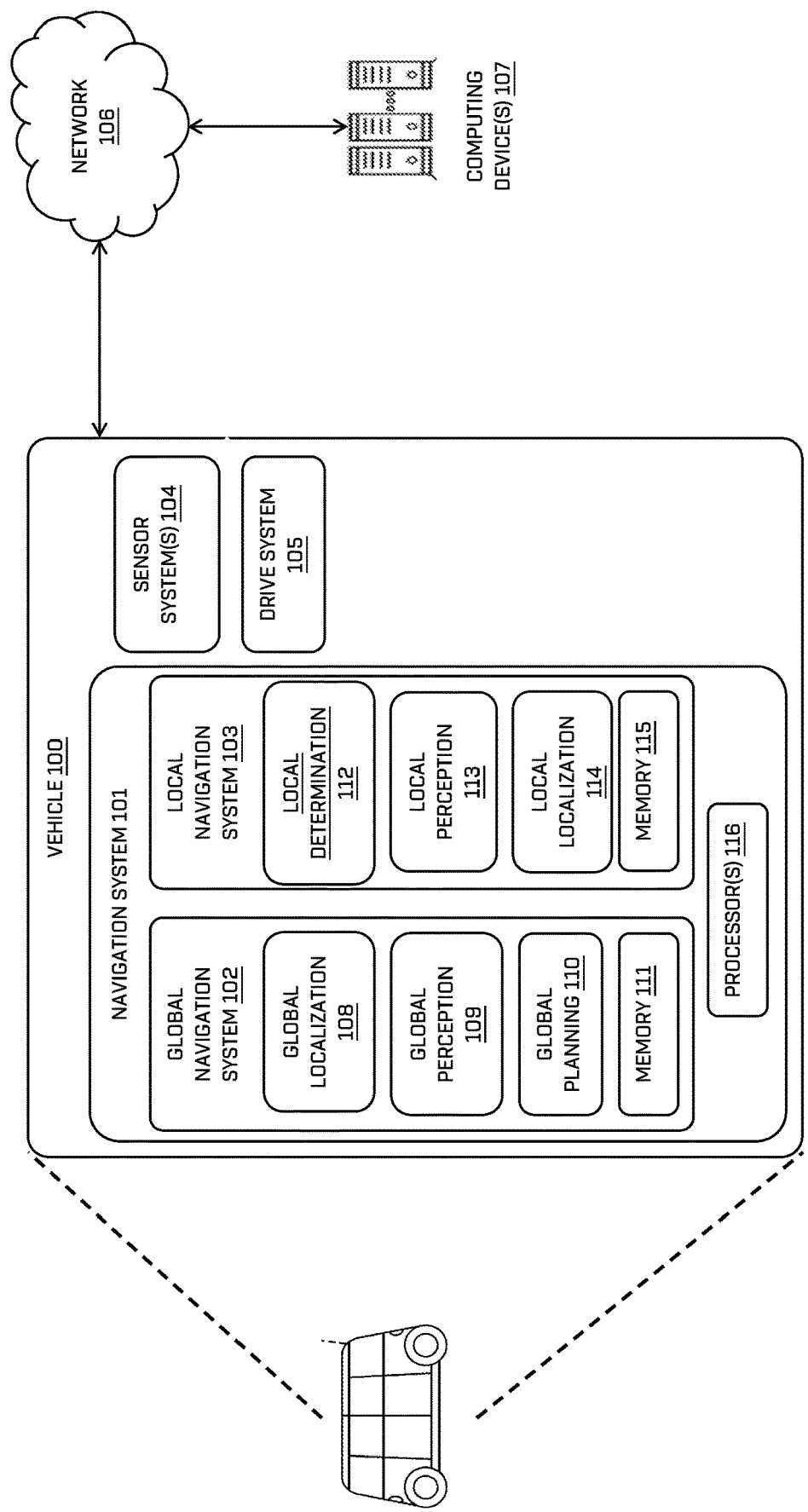
FIG. 1 is a schematic illustration of a vehicle with associated systems and components for performing the techniques described herein.

This application relates to the use of alternative mapping (which may be based on depth data) of an environment to improve the localization of an autonomous vehicle within the environment, or to update a global map used by the autonomous vehicle to navigate through the same environment. In various examples described herein, such a global map may represent a large environment and, in at least some examples, be previously created based on optimizations of previously acquired data, whereas the local map may represent a portion of the environment proximate the system (e.g., a vehicle) and be determined in accordance with differing techniques as compared to the creation of the global map. By maintaining a local map with a high refresh rate, the vehicle can more ably respond to changes in the environment and navigate in environments with poor global localization accuracy. The difference in trajectory of the vehicle between that planned using a 'global' map and that generated using the local map can then be used to improve the accuracy of the global map. Similarly, the drift between the co-ordinate frames representing the global map and the local map can be used to improve the accuracy and robustness of the global map.

When a system, such as an autonomous vehicle, utilizes a global map to navigate, pose errors may arise in certain areas with poor localization accuracy. Examples of this include, but are not limited to, world-change scenarios, tunnels, and specific stretches of road. In world-change scenarios, the existing global map is outdated, and the vehicle attempts to localize (determine one or more of a position or orientation, together a pose, with respect to the map) against this outdated map, such as through the use of matching sensor data (e.g., LIDAR) to the global map. Drift occurs, and the position of the vehicle within the map 'jumps,' briefly failing to properly localize the vehicle. In tunnel situations, a global localizer is unreliable due to the occurrence of longitudinal errors—the surrounding environment is repeating, with no clear features, making it difficult for a LIDAR system to properly localize the vehicle within the global map, an aliasing problem. Similarly, on specific stretches of road, distinguishing environmental features are limited, meaning that the global localizer is not able to properly localize the vehicle, and drift begins to occur.

In the present application, a second map is implemented, mapping only the environment local (proximate) to the vehicle, with a high refresh rate. This local map provides a map of the environment accurate at the moment of creation, not linked to the global map and therefore not susceptible to the localization errors described above.

The global map may be used to calculate a trajectory for the vehicle through the environment. The pose of the vehicle at various points in time, as it moves along this planned trajectory, may be determined relative to the global map, and may be stored as a first series of poses. As the vehicle moves through the environment, the second (local) map is initiated, and the pose of the vehicle at various points in time may be determined, relative to the local map. These poses relative to the local map may then be stored as a second series of poses. The first and second series of poses may be compared to each other, and the difference between the two series of poses may be calculated. This difference may be used as a measure of the drift between the local and global maps, and may then be used to update the poses determined according to the global map, and the vehicle may be controlled through the environment based on the updated poses. This enables more accurate localization of the vehicle within the environment. The difference between the two maps may be used to identify the local map as a 'trusted' map. If the difference between the two maps exceeds a predetermined threshold, or if a particular structure is apparent in the difference—such as the difference consistently trending in a particular direction—this may indicate a need to update the global map, which may be updated based at least in part on the difference calculated between the maps.

In another example of the present invention, co-ordinate frames corresponding to the global map and local map may be determined. A third co-ordinate frame representing the position of the vehicle itself may also be determined. A transform, or offset, between the co-ordinate frames representing the global and local maps may be calculated, representing the drift between the two maps. Similarly, a transform or offset may be calculated between the co-ordinate frames representing the local map and the vehicle position. Using these calculated transforms, a calculation may then be made of the transform between the co-ordinate frame representing the global map and that representing the vehicle position. By using the local map co-ordinate frame—which, as described above, is accurate in relation to the environment due to it being created at the point of use—the transform calculated between the global map frame and the vehicle frame will provide a more accurate measure of the vehicle position relative to the global map. In this way, the drift between the local and global maps (as calculated as a transform between the two co-ordinate frames) may be used to update the global map or otherwise used to ensure the vehicle is able to safely navigate the environment.

Accordingly, techniques (including, but not limited to, a method, a system, and one or more non-transitory computer-readable media) may be provided as discussed herein.

A vehicle 100 is illustrated schematically in the block diagram of FIG. 1. Vehicle 100 may include a navigation system 101. Navigation system 101 may further comprise a global navigation system 102, a local navigation system 103, memory 111 and processor 115. Vehicle 100 may further comprise sensor system 104, and a drive system 105. Vehicle 100 may be connected over network 106 to a computing device 107.

For the purpose of illustration, the vehicle 100 can be an autonomous vehicle configured to operate according to a Level 5 classification issued in 2013 by the U.S. National Highway Traffic Safety Administration, which describes a vehicle capable of performing all safety-critical functions for the entire trip, with the driver (or occupant) not being expected to control the vehicle at any time. This is merely an example, and the systems and methods described herein may be incorporated into any vehicle and/or robot, including those ranging from vehicles that need to be manually controlled by a driver at all times, to those that are partially autonomously controlled, such that they can be autonomously controlled without driver attention or assist during certain driving conditions, such as, for example, while operating on limited-access highways, but such that they require driver attention and/or assistance during other driving conditions, such as, for example, while operating on city streets in urban areas, or during at least some parking functions.

Global navigation system 102 may be configured to determine positional information for controlling vehicle 100 in order to navigate vehicle 100 through an environment. The positional information may, for example, be determined by global navigation system 102 and communicated to drive system 105. Drive system 105 may then move the vehicle through the environment in accordance with the positional information. This positional information may be determined in a variety of ways, from a variety of sources, and may take a variety of forms. By way of example and not limitation, in FIG. 1 global navigation system 102 may comprise a global localization component 108, a global perception component 109, and a global planning component 110. The person skilled in the art will appreciate that in some examples, components of navigation system 101, such as global localization component 108, or global perception component 109, may be located in memory element 111.

In at least one example, global localization component 108 may be configured to receive data from sensor system 104, in order to determine a position and/or orientation of vehicle 100 in the environment. The information received—such as LIDAR data—may then be matched against a global map. The global map may be stored on the vehicle in memory element 111, or in some examples may be received across network 106. Global localization component 108 may use any applicable technique in order to perform this operation, such as SLAM (Simultaneous Location And Mapping), relative SLAM, non-linear least square optimization, iterative closest point (ICP), bundle adjustment, CLAMS (Calibration, Localization And Mapping Simultaneously), or any other applicable technique. These techniques may be performed based on LIDAR data, radar data, GPS data, wheel factor data, IMU data, or other data captured by any component of sensor system 104.

In at least one example, sensor system 104 may include LIDAR (Light Detection And Ranging) sensors, RADAR sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), cameras (e.g., red-green-blue (RGB), infrared (IR), intensity, depth, time of flight, etc.), microphones, wheel encoders, environment sensors (e.g., temperature sensors, humidity sensors, light sensors, pressure sensors, etc.), etc. Sensor system 104 may include multiple instances of each of these or other types of sensors. For instance, the LIDAR sensors may include individual LIDAR sensors located at the corners, front, back, sides, and/or top of vehicle 100. As another example, the cameras may include multiple cameras disposed at various locations about the exterior and/or interior of vehicle 100.

In some examples, global perception component 109 can include functionality to perform object detection, segmentation, and/or classification. In some examples, the perception component 322 can provide processed sensor data that indicates a presence of an entity that is proximate to the vehicle 302 and/or a classification of the entity as an entity type (e.g., car, pedestrian, cyclist, animal, building, tree, road surface, curb, sidewalk, unknown, etc.). In additional or alternative examples, the perception component 322 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some examples, global localization component 108 and global perception component 109 may, in creating a global map, be configured to disregard objects having characteristics indicative of a dynamic object. For instance, objects having a velocity or an acceleration above a threshold value may be disregarded. In some examples, the ability to disregard objects having a velocity or acceleration above a threshold value may be based on methods for performing segmentation on three-dimensional data represented in a voxel space to determine a ground plane, static objects, and dynamic objects in an environment as described in U.S. Pat. No. 10,444,759 B2, titled "VOXEL BASED GROUND PLANE ESTIMATION AND OBJECT SEGMENTATION," filed on Jun. 14, 2017 which is hereby incorporated by reference in its entirety and for all purposes. Global planning component 110 may be configured to determine a trajectory for vehicle 100 through the environment. This determination may involve the determination of a route between a current, or first, location and a target, or second, location. This route may include a sequence of intermediate locations. Global planning component 110 may be configured to determine, based on information provided by global localization component 108 and global perception component 109, as well as on date received from sensor system 104, instructions for navigating vehicle 100 along the determined trajectory. These instructions may be passed to drive system 105 to navigate the vehicle through the environment.

Drive system 105 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.).

In other examples, global navigation system 102 may receive a map, and or portion thereof—which, in at least some examples, may be based at least in part on a rough estimate of location, through network 106 from computing device 107. A map thus received may be stored in memory element 111. Computing device 107 may include, but is not limited to, a separate autonomous vehicle or a central server.

Local navigation system 103 may be configured to generate a local map of the environment surrounding vehicle 100 and determine positional information for controlling vehicle 100 through said environment. Local navigation system 103 may comprise local determination component 112, local perception component 113, local localization component 114 and memory component 115.

Local determination component 112 may be configured to receive data from sensor system 104. This data, which in one example may comprise LIDAR data, may then be associated with a voxel space comprising a plurality of voxels. Local localization component 112 may then determine a ground plane—this may be performed by determining a surface normal vector associated with an individual voxel in the voxel space, determining a vehicle reference direction, determining that the individual voxel is a locally flat voxel based at least in part on the surface normal vector and the reference direction—such as by calculating that the surface normal vector is within a threshold angle of the reference direction—and determining a ground cluster of locally flat voxels. Voxels within a predetermined angular range of the ground cluster may be determined as belonging to the ground plane. The ground plane may then be removed from the voxel space. Incorporate by reference U.S. Pat. No. 10,444,759 B2.

Local perception component 113 may then be used to determine objects in the environment proximate to the vehicle. This may comprise clustering adjacent voxels within the subset of the voxel space determined by removing the ground plane. This clustering operation may determine that specific LIDAR data points are associated with an object. The objects identified by local perception component 113 may then be used to generate a map of the environment proximate to the vehicle. Local perception component 113 may additionally be configured to disregard dynamic objects—this process may comprise determining that a given voxel is not occupied at a first time and determining that the voxel is occupied at a second time. This may include ray casting operations to perform this determination. In some examples, the local mapping process conducted in this invention may be based on methods for performing segmentation on three-dimensional data represented in a voxel space to determine a ground plane, static objects, and dynamic objects in an environment as described in U.S. Pat. No. 10,444,759 B2, titled "VOXEL BASED GROUND PLANE ESTIMATION AND OBJECT SEGMENTATION," filed on Jun. 14, 2017 which is hereby incorporated by reference in its entirety and for all purposes.

Local localization component 114 may then, based on the map created using the objects in identified by local perception component 113, determine a pose of the vehicle within the environment. The pose of the vehicle thus determined may be stored in memory element 114.

In some examples, local navigation system 103 may be configured to receive sensor data from sensor system 104, and generate a local map using local localization component 112 and local perception component 113 at a higher rate than the refresh rate of the global map.

Navigation system 101 may further comprise a processor element 115. Processor element 115 may be configured to receive data from global navigation system 102 and local navigation system 103. This data may include maps, co-ordinate frames, localization data, pose data, calculated trajectories, or other relevant data. Processor element may be configured to perform computations on this data, including but not limited to comparisons of the first series of poses determined based on the global map to the second series of poses determined based on the local map, comparisons of co-ordinate frames corresponding to global and local maps, and calculations of drift between such global and local maps. The results of these computations may be transmitted to other elements of navigation system 101—for example, a calculated measure of drift between a global map and a local map generated by local navigation system 103 may be passed to global navigation system 102 for use in generating a subsequent updated global map, or stored in memory 111 for the same purpose. In other examples, the results of computations performed by processor element 115 may be transmitted across network 106 to computing device 107 for use in future navigation calculations of additional vehicles.

In a first example of the present invention, global navigation system 102 may generate a map of an environment. This may comprise receiving a first set of LIDAR data points from sensor system 104, comparing these data points to data received from network 106 or stored in memory 111, determining a point cloud registration between the first LIDAR data points and the data from network 105 or memory 111, and generating a map based on the registration. Alternatively, a complete map may be stored in memory 111 or received over network 106. Global localization component 108 may then localize vehicle 100 within the map thus generated, providing a preliminary position of vehicle 100 in the environment. Global perception component 109 may identify objects within the environment. Based at least on the map generated, the preliminary position of vehicle 100 provided by global localization component 108 and objects identified by global perception component 109, global planning component 110 may then compute a planned first trajectory for vehicle 100 through the environment. Global planning component may determine a pose for vehicle 100 in the environment, and continue determining this pose at various points in time, forming a first series of poses. This first series of poses may be stored in memory element 111.

According to the first example, local navigation system 103 may then generate a local map of the environment. This may comprise receiving, from sensor system 104, sensor data relating to the environment, such as a set of LIDAR data points. Local determination component 112 may associate, as a local map, these LIDAR data points with a voxel space having a plurality of voxels, and determine a ground plane based on clustering voxels having a surface normal vector within a threshold angle of a vehicle reference direction, remove this ground plane from the voxel space. Local perception component 113 may then cluster adjacent voxels within the voxel space to determine objects in the environment. The local mapping process conducted in this invention may be based on methods for performing segmentation on three-dimensional data represented in a voxel space to determine a ground plane, static objects, and dynamic objects in an environment as described in U.S. Pat. No. 10,444,759 B2, titled "VOXEL BASED GROUND PLANE ESTIMATION AND OBJECT SEGMENTATION," filed on Jun. 14, 2017 which is hereby incorporated by reference in its entirety and for all purposes. Local localization component 114 may then determine a pose of the vehicle in the environment, based on the map generated by local determination component 112 and local perception component 113. As described previously in connection with the components of local navigation system 103, this process may occur at a higher frequency than the refresh rate of the global map. Each pose of the vehicle 100 computed by local navigation system 103 may be stored in the local memory 115 as a second series of poses, with a historical trajectory relative to the local map being formed by the change in poses. The historical trajectory may be calculated as the change between poses within the second series of poses, which may be determined by integrating LIDAR odometry measurements with the positional data. Local navigation system 100 may, to determine the change in pose, associate at a first point in time a set of LIDAR data points with a first voxel space associated with a first pose within the second series of poses, then associate at a second point in time the set of LIDAR data points with a second voxel space associated with a second pose within the second series of poses, and calculate the odometry match between the first and second voxel spaces.

In some examples, the positioning data indicative of each pose of the second series of poses may be filtered, to improve the accuracy of the local positioning data. This filtering may be effected through the use of a recursive filter such as a Bayesian estimator.

As vehicle 100 moves along the trajectory generated by global navigation system 102, the second series of poses, computed relative to the local map, may diverge from the first series of poses computed relative to the global map. Processor element 115 may receive information relating to the first series of poses and second series of poses, and calculate the difference between the two. This difference between the first and second series of poses may be determined by measuring the difference in the position of vehicle 100 relative to the first map to the position of vehicle 100 relative to the second map, at the same point in time. Multiple differences in pose may be averaged over a predetermined period of time in order to calculate an average difference in position, providing a difference between the two maps.

The difference thus calculated may be used to improve the localization of vehicle 100, or may in some examples be used to improve the robustness of the global map. In one example, the calculated measure of difference between the first (global) map and second (local) map may be passed to global navigation system 102, and may be considered as an additional factor when performing localizing operations relative to the global map. In other examples, the pose of the vehicle relative to the global map may be adjusted to correspond to the pose of the vehicle relative to the local map—i.e. the first series of poses may be updated to correspond to the second series of poses. In other examples, if the calculated measure of difference exceeds a predetermined threshold—or if a particular structure is apparent in the difference, such as a consistent drift in a given direction—the first (global) map may be disregarded, and the local map may be passed to drive system 105 and used to navigate vehicle 100 through the environment. The calculated difference may also be passed across network 106 to computing device 107, for use in future navigational calculations in additional vehicles.

In a second example of the present invention, a first global map and a second local map may be generated as described with regard to the first example.

According to the second example, processor element 115 may then determine co-ordinate frames corresponding to the global map and local map generated by local navigation system 103. A first co-ordinate frame may be determined corresponding to the first global map and comprising an origin point. Positional information with respect to the global map may be determined relative to the first origin point. A second co-ordinate frame may be determined corresponding to the second local map, the second co-ordinate frame comprising a second origin point different from the first origin point. The positional information determined with respect to the local map—such as that described with regard to the first example—may be determined relative to the second origin point.

The location of the second origin, corresponding to the second local co-ordinate frame, may also be represented as a position within the first global co-ordinate frame, relative to the first origin. A transform between the first (global) origin and second (local) origin may therefore be calculated.

A third co-ordinate frame may be determined, corresponding to the position of vehicle 100 at a given time. The third co-ordinate frame comprises a third origin point different from the first and second origin points. The location of the third origin point, corresponding to the third co-ordinate frame, may be represented as a position within both the first co-ordinate frame and second co-ordinate frames, relative to the first and second origin points respectively. A transform between the first origin and third origin will provide the expected location of vehicle 100 relative to the first (global) map, but may be inaccurate due to existing errors in the global map. This transform may be more accurately calculated using the transform between the first origin and second origin, and between the second origin and third origin.

The transform calculated between the first origin and the third origin may be compared to an expected transform between the same points (e.g., by using the second origin as an intermediate origin). This allows the calculation of a difference between the first map and the second map.

The difference thus calculated may be used to improve the localization of vehicle 100, or may in some examples be used to improve the robustness of the global map. In one example, the calculated measure of difference between the first (global) map and second (local) map may be passed to global navigation system 102, and may be considered as an additional factor when performing localizing operations relative to the global map. In other examples, the pose of the vehicle relative to the global map may be adjusted to correspond to the pose of the vehicle relative to the local map. In other examples, if the calculated measure of difference exceeds a predetermined threshold—or if a particular structure is apparent in the difference, such as a consistent drift in a given direction—the first (global) map may be disregarded, and the local map may be passed to drive system 105 and used to navigate vehicle 100 through the environment. Furthermore, if the difference exceeds said predetermined threshold or exhibits such a structure, this may indicate a need to update the global map, and data from the local map may be added to the global map. The calculated difference may also be passed across network 106 to computing device 107, for use in future navigational calculations in additional vehicles.

Figure 2:
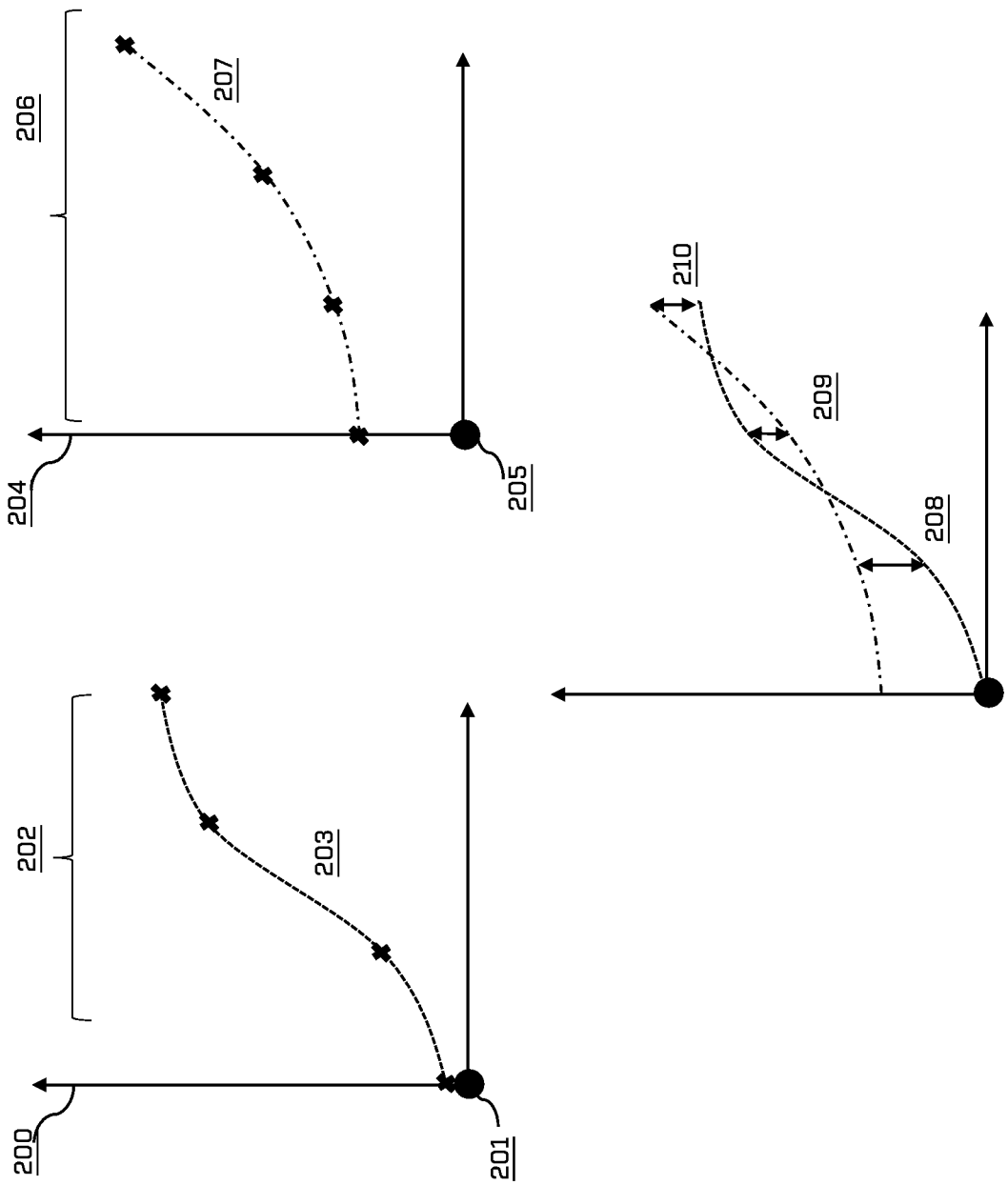
FIG. 2 is an illustration of different trajectories of a vehicle according to first and second maps.

A comparison of planned first and second trajectories according to the first example is illustrated schematically in FIG. 2. A first co-ordinate frame 200, corresponding to the first global map generated by global navigation system 102, comprises a first origin point 201. The x-axis of frame 300 corresponds to time, while the y-axis represents one component of the positional information of the vehicle. The skilled person will appreciate that in practice the positional information will include further components. A first set of positional information 202, corresponding to a series of poses of the vehicle within the first global map at different times $t_1$, $t_2$ and $t_3$, is referenced relative to first origin point 201. Line 203 represents the trajectory of vehicle 100 through the environment computed by global planning component 110.

A second co-ordinate frame 204, corresponding to the second local map generated by local navigation system 103, comprises a second origin point 205. The axes of frame 204 correspond to those of frame 200. A second set of positional information 206, corresponding to poses of vehicle 100 within the local map at times $t_1$, $t_2$ and $t_3$, is referenced relative to second origin point 205. Positional information 206 may, in some examples, have been filtered prior to being used as localization information. In some examples, this may be achieved through the use of a recursive filter, such as a Bayesian estimator. Line 207 represents a second trajectory of vehicle 100 through the environment, based on the localization data provided by localization component 112 and objects identified by perception component 113. This trajectory is equivalent to the change between poses within the second series of poses—as described above, the change between poses within the second series of poses may be calculated by integrating LIDAR odometry measurements. The two trajectories may not share a common origin, as the origin of trajectory 206 will depend on the point at which the local mapping is initiated, rather than on the global origin.

As may be seen from co-ordinate frames 200 and 204, the first series of poses 202 differ from second series of poses 206. This divergence is shown more clearly in schematic 207, where trajectories 203 and 206 are overlaid on a common co-ordinate frame. Differences 208, 209 and 210 are shown on the common frame, being taken at times $t_1$, $t_2$ and $t_3$ respectively. These differences may be calculated as the distance (e.g., Euclidian distance) between the position of vehicle 100 following trajectory 207 from the prospective position of the vehicle 100 had it followed planned trajectory 203.

The difference between trajectories 203 and 206 calculated by processor element 115 may be transmitted to other elements of navigation system 101. The difference thus calculated may be used to improve the localization of vehicle 100, or may in some examples be used to improve the robustness of the global map. In one example, the calculated measure of difference between the first (global) map and second (local) map may be passed to global navigation system 102, and may be considered as an additional factor when performing localizing operations relative to the global map. This may include steps such as down-weighting existing global map data and upweighting data from the local map. In other examples, the pose of the vehicle relative to the global map may be adjusted to correspond to the pose of the vehicle relative to the local map—i.e. the first series of poses may be updated to correspond to the second series of poses. In other examples, if the calculated measure of difference exceeds a predetermined threshold—or if a particular structure is apparent in the difference, such as a consistent drift in a given direction—the first (global) map may be disregarded, and the local map may be passed to drive system 105 and used to navigate vehicle 100 through the environment. Furthermore, if the difference exceeds said predetermined threshold or exhibits such a structure, this may indicate a need to update the global map, and data from the local map may be added to the global map. The calculated difference may also be passed across network 106 to computing device 107, for use in future navigational calculations in additional vehicles.

Differences 208, 209 and 210 may, in some examples, then be averaged over the time period $t_0$ to $t_n$, providing a measure of drift between planned trajectory 203 and trajectory 206. In some examples, if the measures of difference calculated at $t_0$, $t_1$, $t_2$ . . . $t_n$ are above a certain threshold value, or if a particular structure is apparent in the measures of difference—for example, if the difference is consistently in the same direction or along the same axis—the local map may be used to update the global map, as such differences may indicate a sufficiently dramatic shift in the environment as to require a larger update. Such an update may, in some examples, be communicated across network 106 to computing device 107, for use in future mapping processes of additional vehicles.

Figure 3:
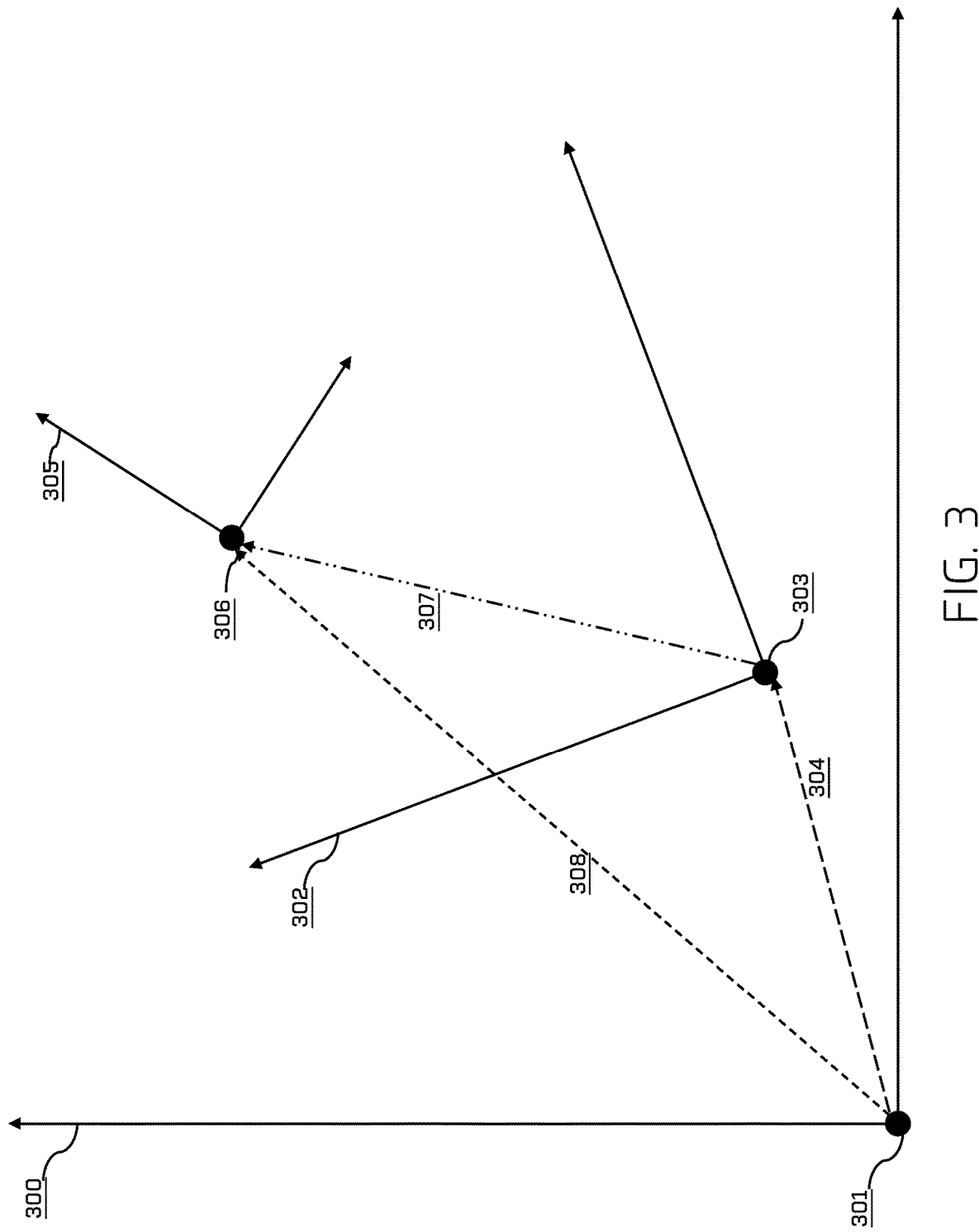
FIG. 3 is an illustration of separation between co-ordinate frames.

FIG. 3 provides a schematic illustration of the calculation of drift between global and local maps through calculation of the transform between co-ordinate frames, according to the second example of the present invention. While the co-ordinate frames and transforms in FIG. 3 are all shown in, and discussed with respect to, two dimensions, the person skilled in the art will appreciate that co-ordinate frames and transforms having higher orders of dimensionality are also envisaged.

A first co-ordinate frame 300, corresponding to the global map as described above in relation to FIG. 1, comprises a first origin point 301.

A second co-ordinate frame 302, corresponding to a local map generated by local navigation system 103 as described above in connection with FIG. 1, illustrated as a two-dimensional frame having an x-axis and a y-axis, comprises a second origin point 303. Second origin point 303, and second co-ordinate frame 302 generally, can be referenced relative to first origin point 301, as points in first co-ordinate frame 300. The separation of the two origins may be calculated as a transform of first origin 301 to second origin 303. This transform is shown in FIG. 3 as transform 304.

A third co-ordinate frame 305, illustrated as a two-dimensional frame having an x-axis and a y-axis, comprises a third origin point 306. Third origin point 306 corresponds to a position of vehicle 100 in an environment.

Third origin point 306 and third co-ordinate frame 305 generally can be referenced relative to second origin point 303, as points in second co-ordinate frame 302. The separation of the two origins may be calculated as a transform of second origin 301 to third origin 306. This transform is shown in FIG. 3 as second transform 307.

Third origin point 306 and third co-ordinate frame 305 generally can also be referenced relative to first origin point 301, as points in first co-ordinate frame 300. In situation wherein no errors may be included in the determination of each co-ordinate frame, the separation of third origin point 306 from first origin point 301 could be calculated by taking a transform of first origin point 301 to third origin point 306. However, in real-world situations, errors due to poor localization, world-change scenarios, or a lack of distinguishing features may adversely affect the mapping process. This therefore adversely affects the accuracy of localizing vehicle 100, represented by third origin point 306, in the global map, represented by first co-ordinate frame 300. The position of vehicle 100 in the global map may therefore not be accurate to the actual position of vehicle 100 in the environment, and this inaccuracy may transfer to the position of third origin point 306 within first co-ordinate frame 300 relative to first origin point 301. Consequently, as global navigation system 102 may determine the position of third origin point 306 inaccurately within first co-ordinate frame 300 relative to first origin point 301, were such a transform to be taken, it would be taken between an incorrectly-located, expected position of third origin point 308 within first co-ordinate frame 300, meaning that such a transform would not accurately reflect the separation between first origin point 301 and third origin point 308, therefore inaccurately representing the position of vehicle 100 within the environment and, as such, may represent a significant safety concern for operation of the vehicle 100.

An accurate determination of the separation between first origin point 301 and third origin point 308 may instead be obtained by using first and second transforms 304 and 307.

Transform 304, representing the offset between the global map corresponding to co-ordinate frame 300 and the local map corresponding to co-ordinate frame 302 may be calculated using a previously-calculated, accurate, offset between first co-ordinate frame 300 and third co-ordinate frame 305—i.e. a previously-determined value of transform 308. This offset may be accurate in areas of good localization—i.e. at a previous point in time. This previously-obtained value, along with the current value of transform 307, may be used to calculate the current value of transform 304. Transform 304 must be calculated for each iteration of the process, as second co-ordinate frame 302 may drift in relation to first co-ordinate frame 300, thus the offset between second origin point 303 and first origin point 301 may vary over time.

In some examples, the previously-obtained value for offset 308 may be a filtered value, wherein the value has been filtered using a recursive filter such as a Bayesian estimator. In some examples, the accurate value of transform 304 may be calculated by multiplying the inverse of previously-obtained transform 308 by transform 307.

The positioning of the pose of vehicle 100, corresponding to third origin point 306 within second co-ordinate frame 302 will be accurate, as the local map—to which second co-ordinate frame 302 corresponds—is created at the point of use. The local map, and therefore second co-ordinate frame 302, is therefore 'correct' to the actual environment navigated by vehicle 100. Vehicle 100, navigating using this map, will therefore have a similarly 'correct' position. Transform 307 will therefore provide an accurate measure of the separation between second origin point 303 and third origin point 306.

Using the calculated value for transform 304 and the value of transform 307, an accurate present value for transform 308 may be calculated. By multiplying transform 304 by transform 307, the calculated value of transform 308 provides an updated, accurate position of third origin point 306 in co-ordinate frame 300—and therefore a correspondingly-accurate determination of the position of vehicle 100 relative to the global map.

This process allows for increased accuracy and robustness in the global map. The positioning of third origin point 306 within second co-ordinate frame 302 will be accurate, as the local map—to which second co-ordinate frame 302 corresponds—is created at the point of use. The local map, and therefore second co-ordinate frame 302, is therefore 'correct' to the actual environment navigated by vehicle 100. Vehicle 100, navigating using this map, will therefore have a similarly 'correct' position. The localization of vehicle 100 within the global map may therefore be improved.

The difference thus calculated may be used to improve the localization of vehicle 100, or may in some examples be used to improve the robustness of the global map. In one example, the calculated measure of difference between the first (global) map and second (local) map may be passed to global navigation system 102, and may be considered as an additional factor when performing localizing operations relative to the global map. This may include steps such as downweighting existing global map data and upweighting data from the local map. In other examples, the pose of the vehicle relative to the global map may be adjusted to correspond to the pose of the vehicle relative to the local map—i.e. the first series of poses may be updated to correspond to the second series of poses. In other examples, if the calculated measure of difference exceeds a predetermined threshold—or if a particular structure is apparent in the difference, such as a consistent drift in a given direction—the first (global) map may be disregarded, and the local map may be passed to drive system 105 and used to navigate vehicle 100 through the environment. Furthermore, if the difference exceeds said predetermined threshold or exhibits such a structure, this may indicate a need to update the global map, and data from the local map may be added to the global map. The calculated difference may also be passed across network 106 to computing device 107, for use in future navigational calculations in additional vehicles.

Figure 4:
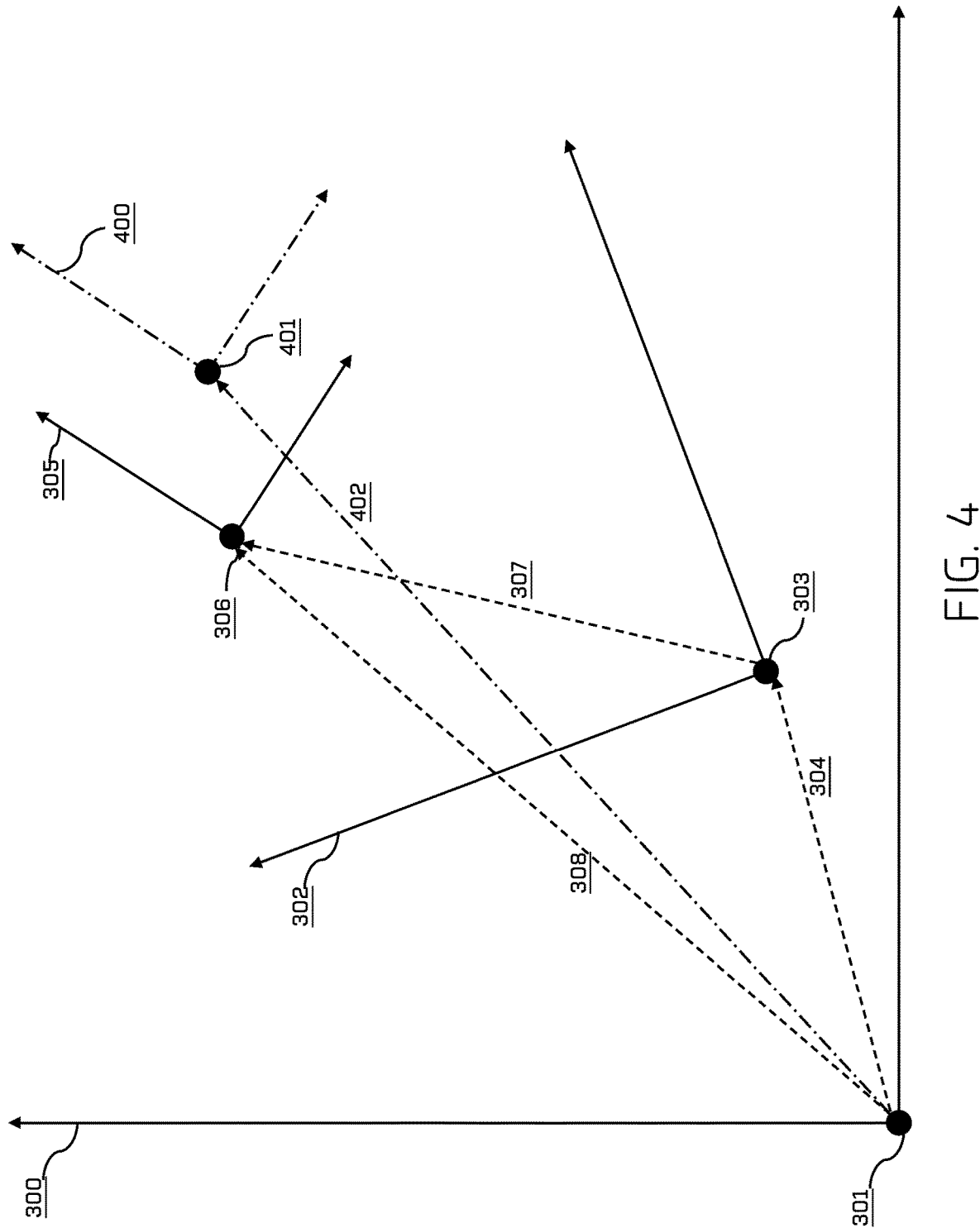
FIG. 4 is an illustration of difference between an expected and calculated separation between co-ordinate frames.

FIG. 4 shows in greater detail the discrepancy between an incorrect transform between the global origin 301 and the pose of vehicle 100, and a calculated transform for the same. Transform 400 represents the expected offset of vehicle 100 from global origin 301. However, this transform may be inaccurate due to localization errors, such as aliasing problems, as described previously. Transform 400 therefore does not provide an accurate offset between first origin point 301—the global origin—and third origin point 308—the pose of vehicle 100—but rather the transform between the global origin and an expected pose of vehicle 100, to which fourth origin point 401 and fourth co-ordinate frame 402 correspond.

Figure 5:
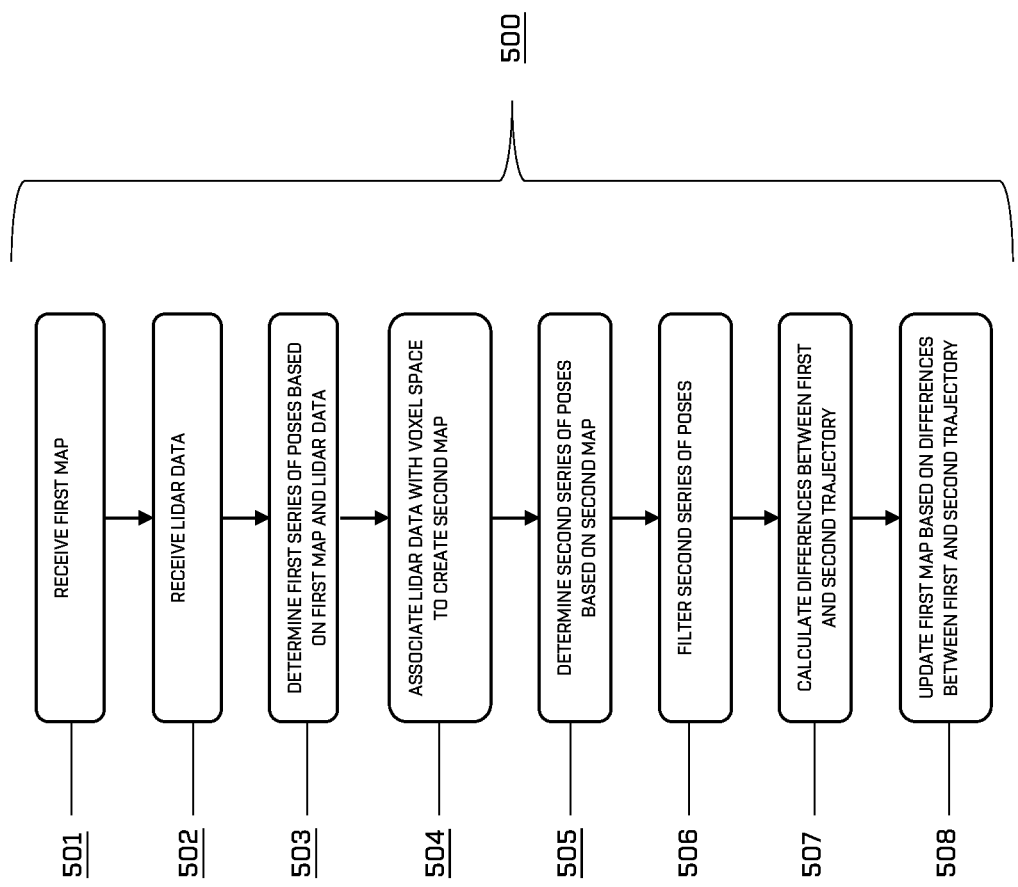
FIG. 5 is a flow diagram illustrating an example process for updating a global map based on a drift in trajectory of a vehicle.

A method 500, in accordance with the first example described in connection with FIGS. 1 and 2, is illustrated in FIG. 5. The skilled person will appreciate that this flow chart is provided by way of example and not limitation, and the operations depicted therein may be performed in any order, steps may be omitted, and operations not depicted may occur The method 500 comprises receiving 501 a first map. This map may be received across a network connection 106, received from a memory element 111, or may be generated using a first set of LIDAR data points received from sensory system 104.

Method 500 comprises receiving 502 a set of LIDAR data points. These LIDAR data points may be received from sensor system 104, and may be matched with the map received in step 501 to localize vehicle 100 within the environment.

Method 500 comprises determining 503, using global planning component 110 and based on at least the first map and the set of LIDAR data points, a first series of poses for vehicle 100 as it moves through an environment.

Method 500 comprises associating 504 the LIDAR data with a voxel space. This voxel space may comprise a plurality of voxels and be indicative of a discretized three-dimensional portion of the environment proximate the vehicle. A map may be generated based on the association between the LIDAR data and the voxel space.

Method 500 comprises computing 505, based on the local map a second series of poses for vehicle 100. Method 500 may also, at this point, comprise calculating the difference between poses within the second series of poses. This calculation may comprise associating, at a first point in time, a set of LIDAR data points with a first voxel space associated with a first pose within the second series of poses, and associating at a second point in time the set of LIDAR data points with a second voxel space associated with a second pose within the second series of poses, and calculating the odometry match between the first and second voxel spaces.

Method 500 comprises filtering 506 the data indicating the second series of poses for vehicle 100.

Method 500 comprises calculating 507 the difference between the first series of poses and the second series of poses. This may comprise calculating the difference between the pose of the vehicle according to the first series of poses and the pose of the vehicle according to the second series of poses at the same point in time. This calculation may be repeated at multiple points across a predetermined period of time.

Figure 6:
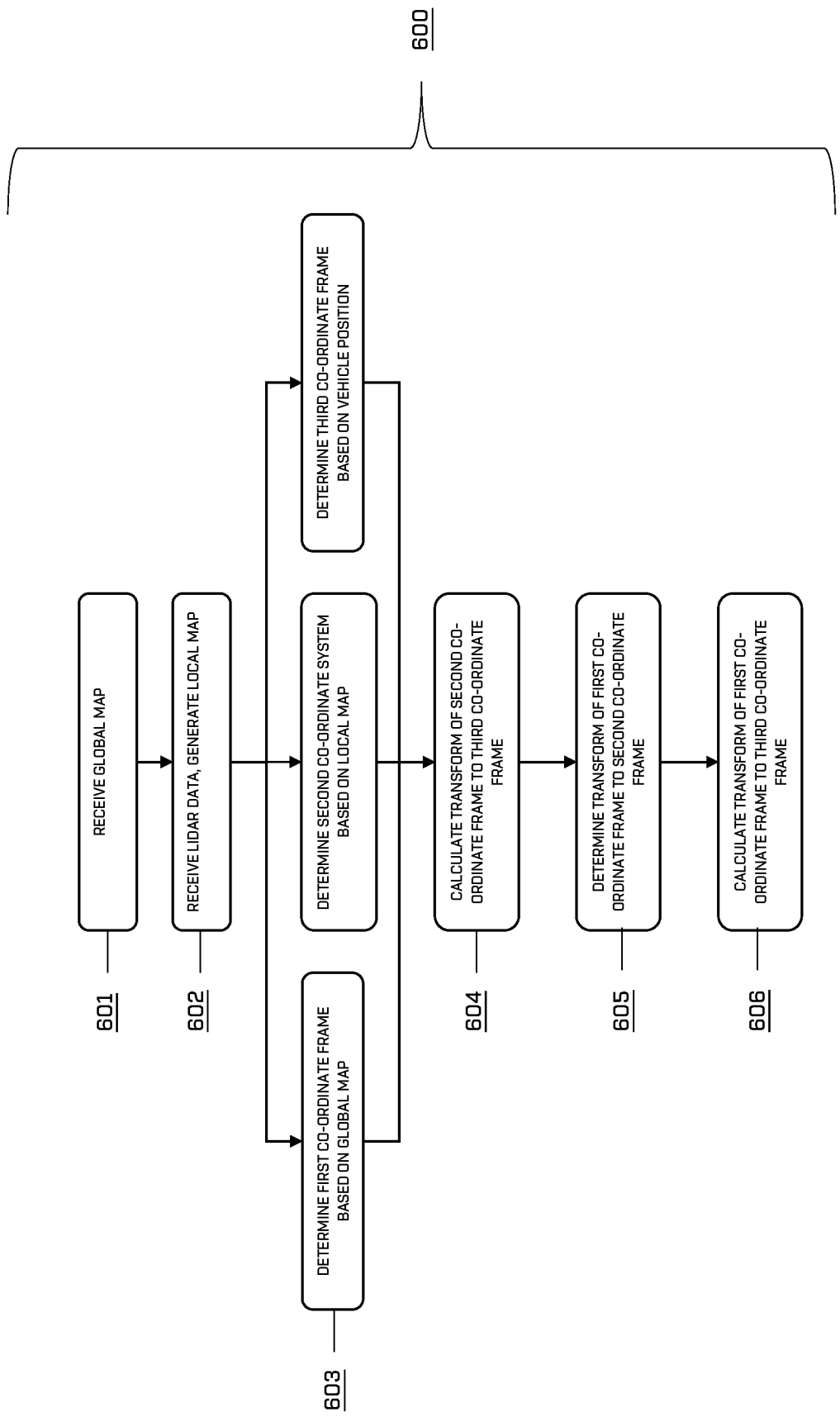
FIG. 6 is a flow diagram illustrating an example process for updating a global map based on a drift in co-ordinate system.

Method 500 comprises updating 508 the first series of poses based at least in part on the difference calculated between the first series of poses and the second series of poses. Method 500 may further comprise controlling vehicle 100 according to the updated first series of poses. Method 500 may additionally comprise providing the difference calculated 507 to other elements of navigation system 101. The difference thus calculated may be used to improve the localization of vehicle 100, or may in some examples be used to improve the robustness of the global map. In one example, the calculated measure of difference between the first (global) map and second (local) map may be passed to global navigation system 102, and may be considered as an additional factor when performing localizing operations relative to the global map. This may include steps such as downweighting existing global map data and upweighting data from the local map. In other examples, the pose of the vehicle relative to the global map may be adjusted to correspond to the pose of the vehicle relative to the local map—i.e. the first series of poses may be updated to correspond to the second series of poses. In other examples, if the calculated measure of difference exceeds a predetermined threshold—or if a particular structure is apparent in the difference, such as a consistent drift in a given direction—the first (global) map may be disregarded, and the local map may be passed to drive system 105 and used to navigate vehicle 100 through the environment. Furthermore, if the difference exceeds said predetermined threshold or exhibits such a structure, this may indicate a need to update the global map, and data from the local map may be added to the global map. The calculated difference may also be passed across network 106 to computing device 107, for use in future navigational calculations in additional vehicles. A method 600, in accordance with the second example described in connection with FIGS. 1 and 3, is illustrated in FIG. 6. The skilled person will appreciate that this flow chart is provided by way of example and not limitation, and the operations depicted therein may be performed in any order, steps may be omitted, and operations not depicted may occur.

Method 600 comprises receiving 601 a global map. This map may be received across a network connection 106, received from a memory element 111, or may be generated using a first set of LIDAR data points received from sensory system 104.

Method 600 comprises receiving 602 a set of LIDAR data points. These LIDAR data points may be used to provide an initial determination of the position of vehicle 100 relative to the global map. They may additionally be associated with a voxel space indicative of a discretized three-dimensional portion of the environment proximate to vehicle 100—this may provide a local map. This step may further comprise, to generate a local map, identifying a ground plane, removing the ground plane from the voxel space to create a subset of the voxel space, and clustering adjacent voxels within the subset of the voxel space to identify objects within the environment proximate to the vehicle.

Method 600 comprises determining 603 first, second and third co-ordinate frames. This determination of co-ordinate frames may be conducted in parallel. These co-ordinate frames may correspond to the global map, the local map, and the pose of vehicle 100, respectively.

Method 600 comprises determining 604 a first transform, of the second co-ordinate frame (corresponding to the local map) to the third co-ordinate frame (corresponding to the current pose of vehicle 100). This transform may correspond to the offset between the local origin and the current pose of vehicle 100.

Method 600 comprises calculating 605 a second transform, of the first co-ordinate frame to the second co-ordinate frame. This transform may correspond to the offset between the first origin point and the second origin point, and may therefore correspond to the offset between the local map and the global map. This may comprise using a previously-determined transform of the first co-ordinate frame to the third co-ordinate frame—i.e. a known offset between the global origin and the position of vehicle 100, obtained at a previous point in time—combined with the transform of the second co-ordinate frame to the third co-ordinate frame. This may provide a transform of a first origin point corresponding to the first co-ordinate frame to a second origin point corresponding to the second co-ordinate frame, wherein the transform provides a measure of the separation between the first origin point and the second origin point. This transform must be calculated each time this process is performed, as the second co-ordinate frame may drift in relation to the first co-ordinate frame, thus the offset may vary.

Method 600 comprises calculating 606 a third transform, of the first co-ordinate frame to the third co-ordinate frame. This may comprise using the first transform calculated between the first and second co-ordinate frames and the second transform calculated between the second and third co-ordinate frames to generate an accurate transform of the first co-ordinate frame to the third co-ordinate frame. This transform may correspond to the offset between the first origin point and the third origin point and therefore to the offset between the global origin and the pose of vehicle 100. This transform may therefore provide an accurate pose of vehicle 100 within the environment.

Method 600 comprises updating the global map based on the third transform. This may comprise adjusting the first co-ordinate frame in dependence on the calculated third transform. This may comprise providing the third transform calculated 608 to other elements of navigation system 101. The difference thus calculated may be used to improve the localization of vehicle 100, or may in some examples be used to improve the robustness of the global map. In one example, the calculated measure of difference between the first (global) map and second (local) map may be passed to global navigation system 102, and may be considered as an additional factor when performing localizing operations relative to the global map. This may include steps such as downweighting existing global map data and upweighting data from the local map. In other examples, the pose of the vehicle relative to the global map may be adjusted to correspond to the pose of the vehicle relative to the local map—i.e. the first series of poses may be updated to correspond to the second series of poses. In other examples, if the calculated measure of difference exceeds a predetermined threshold—or if a particular structure is apparent in the difference, such as a consistent drift in a given direction—the first (global) map may be disregarded, and the local map may be passed to drive system 105 and used to navigate vehicle 100 through the environment. Furthermore, if the difference exceeds said predetermined threshold or exhibits such a structure, this may indicate a need to update the global map, and data from the local map may be added to the global map. The calculated difference may also be passed across network 106 to computing device 107, for use in future navigational calculations in additional vehicles.

Figure 7:
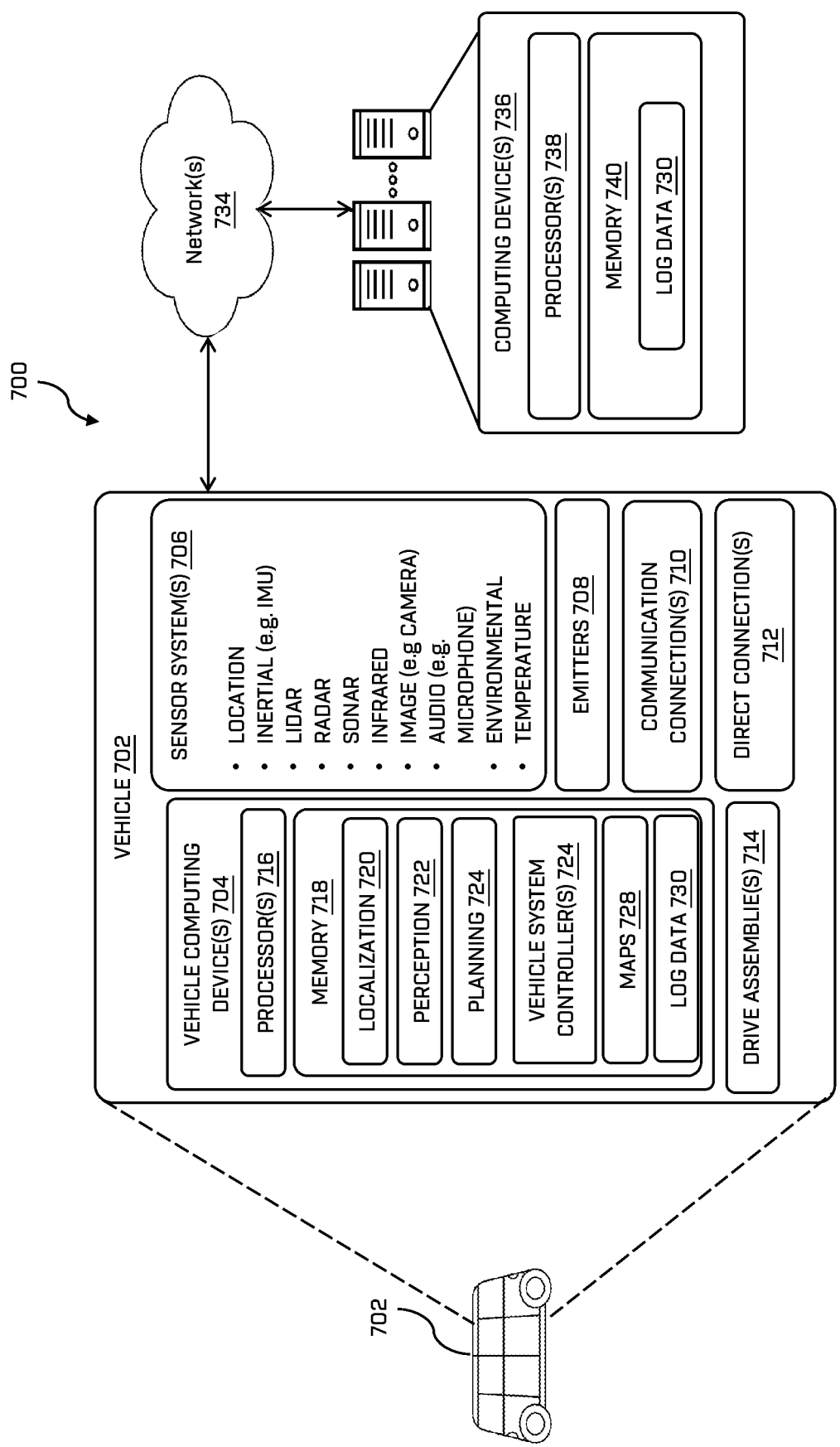
FIG. 7 is a schematic illustration of a system comprising a vehicle and one or more computing device(s) for performing the various techniques described herein.

FIG. 7 is a block diagram illustrating an example system 700 for implementing some of the various technologies described herein. In some examples, the system 700 may include one or multiple features, components, and/or functionality of examples described herein with reference to other figures.

The system 700 may include a vehicle 702. In some examples, the vehicle 702 can include some or all of the features, components, and/or functionality described above with respect to the vehicle 100. The vehicle 702 can comprise a bidirectional vehicle. As shown in FIG. 7, the vehicle 702 can also include a vehicle computing device 704, one or more sensor systems 704, one or more emitters 708, one or more communication connections 710, one or more direct connections 712, and/or one or more drive assemblies 714.

The vehicle computing device 704 can, in some examples, include one or more processors 716 and memory 718 communicatively coupled with the one or more processors 716. In examples, the one or more processors 716 may execute instructions stored in the memory 718 to perform one or more operations on behalf of the one or more vehicle computing devices 704.

The memory 718 of the one or more vehicle computing devices 704 can store a localization component 720, a perception component 722, a planning component 724, one or more vehicle system controllers 726, a map(s) component 728, and log data 730. Though depicted in FIG. 7 as residing in memory 718 for illustrative purposes, it is contemplated that the localization component 720, perception component 722, planning component 724, one or more vehicle system controllers 726, map(s) component 728, and/or the log data 730 can additionally, or alternatively, be accessible to the vehicle 702 (e.g., stored on, or otherwise accessible from, memory remote from the vehicle 702, such as memory 740 of one or more computing devices 736). The localization component 720, the perception component 722, and the planning component 724 can include some or all of the features, components, and/or functionality described above with respect to global localization component 108, then global perception component 109, and global planning component 110.

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 706 or received from one or more other devices (e.g., computing devices 736) to accurately determine a location of the autonomous vehicle. In some instances, the localization component 720 can provide data to various components of the vehicle 702 to determine an initial position of the autonomous vehicle for generating a trajectory and/or for determining to retrieve map data. In various examples, the localization component 720 can provide data to a web-based application that may generate a data visualization associated with the vehicle 702 based at least in part on the data. In some examples the determined position and/or orientation of the vehicle 702 can be measured with reference to coordinate systems that are updated in response to pre-determined conditions being met, as previously described.

In some instances, the perception component 722 can include functionality to perform object tracking, detection, segmentation, and/or classification. In some examples, the perception component 722 can provide processed sensor data that indicates a presence of an entity that is proximate to the vehicle 702 and/or a classification of the entity as an entity type (e.g., car, pedestrian, cyclist, animal, building, tree, road surface, curb, sidewalk, unknown, etc.). In additional and/or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 722 may provide data to a web-based application that generates a data visualization associated with the vehicle 702 based at least in part on the data. In some examples the determined position of detected entities can be measured with reference to coordinate systems that are updated in response to pre-determined conditions being met, as previously described.

In general, the planning component 724 can determine a path for the vehicle 702 to follow to traverse through an environment. For example, the planning component 724 can determine various routes and trajectories and various levels of detail. For example, the planning component 724 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 724 can generate an instruction for guiding the autonomous vehicle along at least a portion of the route from the first location to the second location. In at least one example, the planning component 724 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate. In some examples the determined trajectories and/or waypoints can be measured with reference to coordinate systems that are updated in response to pre-determined conditions being met, as previously described.

In at least one example, the vehicle computing device 704 can include one or more vehicle system controllers 726, which can be configured to control steering, propulsion, braking, safety, emitters, communication, components, and other systems of the vehicle 702. These vehicle system controller(s) 726 can communicate with and/or control corresponding systems of the drive assembly(s) 714 and/or other components of the vehicle 702.

The memory 718 can further include the map(s) component 728 to maintain and/or update one or more maps (not shown) that can be used by the vehicle 702 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 702 can be controlled based at least in part on the maps. That is, the maps can be used in connection with the localization component 720, the perception component 722, and/or the planning component 724 to determine a location of the vehicle 702, identify objects in an environment, and/or generate routes and/or trajectories to navigate within an environment. Additionally, the maps can be used in connection with the web-based application to generate content associated with the vehicle 702, such as a data visualization.

In some examples, the one or more maps can be stored on a remote computing device(s) (accessible via one or more network(s)). In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 718 may also store log data 730 associated with the vehicle. For instance, the log data 730 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 730.

In some instances, aspects of some or all of the memory-stored components discussed herein can include any models, algorithms, and/or machine learning algorithms. For example, in some instances, components in the memory 718 such as the localization component 720, the perception component 722, and/or the planning component 724 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet102, VGG, DenseNet, PointNet, and the like.

In at least one example, the sensor system(s) 706 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 706 can include multiple instances of each of these or other types of sensors. For instance, the lidar sensors can include individual lidar sensors located at the corners, front, back, sides, and/or top of the vehicle 702. As another example, the image sensors can include multiple image sensors disposed at various locations about the exterior and/or interior of the vehicle 702. As an even further example, the audio sensors can include multiple audio sensors disposed at various locations about the exterior and/or interior of the vehicle 702. Additionally, the audio sensors can include an array of a plurality of audio sensors for determining directionality of audio data. The sensor system(s) 706 can provide input to the vehicle computing device 704. Additionally, or alternatively, the sensor system(s) 706 can send sensor data, via the one or more networks 734, to the one or more computing device(s) 736 at a particular frequency, after a lapse of a predetermined period of time, in near real-time, etc.

The vehicle 702 can also include one or more emitters 708 for emitting light and/or sound. The emitters 708 in this example include interior audio and visual emitters to communicate with passengers of the vehicle 702. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 308 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive assembly(s) 714. Also, the communication connection(s) 710 can allow the vehicle 702 to communicate with other nearby computing device(s) (e.g., other nearby vehicles, traffic signals, laptop computers, etc.). The communications connection(s) 710 also enable the vehicle 702 to communicate with a remote teleoperations system or other remote services.

The communications connection(s) 710 can include physical and/or logical interfaces for connecting the vehicle computing device(s) 704 to another computing device (e.g., computing device(s) 736) and/or a network, such as network(s) 734. For example, the communications connection(s) 710 can enable Wi-Fi-based communication such as via frequencies defined by the IEEE 802.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, the direct connection 712 of vehicle 702 can provide a physical interface to couple the one or more drive assembly(s) 714 with the body of the vehicle 702. For example, the direct connection 712 can allow the transfer of energy, fluids, air, data, etc. between the drive assembly(s) 714 and the vehicle 702. In some instances, the direct connection 712 can further releasably secure the drive assembly(s) 714 to the body of the vehicle 702.

In at least one example, the vehicle 702 can include one or more drive assemblies 714. In some examples, the vehicle 702 can have a single drive assembly 714. In at least one example, if the vehicle 702 has multiple drive assemblies 714, individual drive assemblies 714 can be positioned on opposite longitudinal ends of the vehicle 702 (e.g., the leading and trailing ends, the front and the rear, etc.).

The drive assembly(s) 714 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive assembly(s) 714 can include a drive assembly controller which can receive and preprocess data from the sensor system(s) and to control operation of the various vehicle systems. In some examples, the drive assembly controller can include one or more processors and memory communicatively coupled with the one or more processors. The memory can store one or more systems to perform various functionalities of the drive assembly(s) 714. Furthermore, the drive assembly(s) 714 can also include one or more communication connection(s) that enable communication by the respective drive assembly with one or more other local or remote computing device(s). In such a manner parameters relating to the drive assembly(s) 714, for example relating to the high voltage battery, can be transmitted to the computing device 736.

The computing device(s) 736 can include one or more processors 738 and memory 740 that may be communicatively coupled to the one or more processors 738. In some examples the computing device(s) 736 can store log data 730 or other vehicle information transmitted via the communication connection(s) 710. In some example the processor(s) 738 of the computing device(s) 736 can perform modification of the coordinate systems as described herein, and communicate such modified coordinate systems to the vehicle 702.

The processor(s) 716 of the vehicle 702 and the processor(s) 738 of the computing device(s) 736 can be any suitable processor capable of executing instructions to process data and perform operations as described herein. By way of example and not limitation, the processor(s) 716 and 738 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 740 are examples of non-transitory computer-readable media. The memory 718 and 740 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components discussed herein are described as divided for illustrative purposes. However, the operations performed by the various components can be combined or performed in any other component. It should be noted that while FIG. 7 is illustrated as a distributed system, in alternative examples, components of the vehicle 702 can be associated with the computing device(s) 736 and/or components of the computing device(s) 736 can be associated with the vehicle 702. That is, the vehicle 702 can perform one or more of the functions associated with the computing device(s) 736, and vice versa.

EXAMPLE CLAUSES

A: A system comprising: a LIDAR; and one or more processors configured to: receive a first map; receive LIDAR data from the LIDAR; determine, based at least in part on the LIDAR data and the first map, a first series of poses of a vehicle in an environment; determine, based at least in part on the first series of poses and the LIDAR data, a first trajectory for the vehicle to follow; associate, as a second map, the LIDAR data with a voxel space comprising a plurality of voxels, the voxel space indicative of a discretized three-dimensional portion of the environment proximate the vehicle; determine, based at least in part on the second map, a second series of poses of the vehicle in the environment; apply a filter to the second series of poses of the vehicle in the environment; determine a difference between the first series of poses and the filtered second series of poses; update the first series of poses based at least in part on at least one of: the filtered second series of poses; and the difference between the first series of poses and the filtered second series of poses; and control the vehicle based at least in part on the updated first series of poses.

B: A system according to Clause A, wherein determining the second series of poses comprises integrating odometry measurements between a first voxel space associated with a first pose of the second series of poses and a second voxel space associated with a second pose of the second series of poses.

C: A system according to Clause A, wherein determining the difference comprises determining, as a transformation, one or more of a translation or rotation between the first map and the second map.

D: A system according to Clause A, the one or more processors further configured to: identify, as a first condition, that the difference exceeds a predetermined threshold; or determine at least one additional difference between the first series of poses and the filtered second series of poses and identify, as a second condition, a structure of the difference and the at least one additional difference; and update the first map based at least in part on either the first or second conditions.

E: A method comprising: receiving a first map; receiving LIDAR data from the LIDAR; determining, based at least in part on the LIDAR data and the first map, a first series of poses of a vehicle in an environment; determining, based at least in part on the first series of poses and the LIDAR data, a first trajectory for the vehicle to follow; associating, as a second map, the LIDAR data with a voxel space comprising a plurality of voxels, the voxel space indicative of a discretized three-dimensional portion of the environment proximate the vehicle; determining, based at least in part on the second map, a second series of poses of the vehicle in the environment; applying a filter to the second series of poses of the vehicle in the environment; determining a difference between the first series of poses and the filtered second series of poses; updating the first series of poses based at least in part on at least one of: the filtered second series of poses; and the difference between the first series of poses and the filtered second series of poses; and controlling the vehicle based at least in part on the updated first series of poses.

F: A method according to Clause E, wherein determining the second series of poses comprises integrating odometry measurements between a first voxel space associated with a first pose of the second series of poses and a second voxel space associated with a second pose of the second series of poses.

G: A method according to Clause E, wherein determining the difference comprises determining, as a transformation, one or more of a translation or rotation between the first map and the second map.

H: A method according to Clause E, further comprising: identifying, as a first condition, that the difference exceeds a predetermined threshold; or determining at least one additional difference between the first series of poses and the filtered second series of poses and identifying, as a second condition, a structure of the difference and the at least one additional difference; and updating the first map based at least in part on either the first or second conditions.

I: A method according to Clause E, wherein the sensor data comprises LIDAR data, and wherein the second map is created at a higher frequency than a refresh rate of the first map.

J: A method according to Clause E, further comprising: determining a portion of the sensor data associated with a dynamic object proximate the vehicle in the environment, wherein determining the second map comprises determining the second map data at the exclusion of the portion.

K: A method according to Clause E, further comprising determining that the difference between the first series of poses and the second series of poses exceeds a predetermined threshold and, in response to the determination, controlling the vehicle based at least in part on the second map.

L: A method according to Clause E, wherein the filter applied to the second series of poses comprises a recursive filter.

M: One or more non-transitory computer-readable media storing instructions executable by one or more processors of a system, wherein the instructions, when executed, cause the one or more processors to perform operations comprising: receiving a first map; receiving LIDAR data from the LIDAR; determining, based at least in part on the LIDAR data and the first map, a first series of poses of a vehicle in an environment; determining, based at least in part on the first series of poses and the LIDAR data, a first trajectory for the vehicle to follow; associating, as a second map, the LIDAR data with a voxel space comprising a plurality of voxels, the voxel space indicative of a discretized three-dimensional portion of the environment proximate the vehicle; determining, based at least in part on the second map, a second series of poses of the vehicle in the environment; applying a filter to the second series of poses of the vehicle in the environment; determining a difference between the first series of poses and the filtered second series of poses; updating the first series of poses based at least in part on at least one of: the filtered second series of poses; and the difference between the first series of poses and the filtered second series of poses; and controlling the vehicle based at least in part on the updated first series of poses.

N: One or more non-transitory computer-readable media according to Clause M, wherein determining the second series of poses comprises integrating odometry measurements between a first voxel space associated with a first pose of the second series of poses and a second voxel space associated with a second pose of the second series of poses.

O: One or more non-transitory computer-readable media according to Clause M, wherein determining the difference comprises determining, as a transformation, one or more of a translation or rotation between the first map and the second map.

P: One or more non-transitory computer-readable media according to Clause M, the operations further comprising: identifying, as a first condition, that the difference exceeds a predetermined threshold; or determining at least one additional difference between the first series of poses and the filtered second series of poses and identifying, as a second condition, a structure of the difference and the at least one additional difference; and updating the first map based at least in part on either the first or second conditions.

While the example clauses described above are described with respect to one particular implementation, it should be understood that, in the context of this document, the content of the example clauses can also be implemented via a method, device, system, computer-readable medium, and/or another implementation. Additionally, any of examples A-P may be implemented alone or in combination with any other one or more of the examples A-P.

What is claimed is:

1. A system comprising:
    a LIDAR; and
    one or more processors configured to:
        receive a first map;
        receive LIDAR data from the LIDAR;
        determine, based at least in part on the LIDAR data and the first map, a first series of poses of a vehicle in an environment;
        determine, based at least in part on the first series of poses and the LIDAR data, a first trajectory for the vehicle to follow;
        associate, as a second map, the LIDAR data with a voxel space comprising a plurality of voxels, the voxel space indicative of a discretized three-dimensional portion of the environment proximate the vehicle;
        determine, based at least in part on the second map, a second series of poses of the vehicle in the environment;
        apply a filter to the second series of poses of the vehicle in the environment;
        determine a difference between the first series of poses and the filtered second series of poses;
        update the first series of poses based at least in part on at least one of:
            the filtered second series of poses; and
            the difference between the first series of poses and the filtered second series of poses; and
        control the vehicle based at least in part on the updated first series of poses.

2. A system as claimed in claim 1, wherein determining the second series of poses comprises integrating odometry measurements between a first voxel space associated with a first pose of the second series of poses and a second voxel space associated with a second pose of the second series of poses.

3. A system as claimed in claim 1, wherein determining the difference comprises determining, as a transformation, one or more of a translation or rotation between the first map and the second map.

4. A system as claimed in claim 1, the one or more processors further configured to:
    identify, as a first condition, that the difference exceeds a predetermined threshold; or
    determine at least one additional difference between the first series of poses and the filtered second series of poses and identify, as a second condition, a structure of the difference and the at least one additional difference; and
    update the first map based at least in part on either the first or second conditions.

5. A method comprising:
    receiving a first map;
    receiving sensor data from a sensor;
    determining, based at least in part on the sensor data and the first map, a first series of poses of a vehicle in an environment;
    determining, based at least in part on the position and the sensor data, a first trajectory for the vehicle to follow;
    associating, as a second map, the sensor data with a voxel space comprising a plurality of voxels, the voxel space indicative of a discretized three-dimensional portion of the environment proximate the vehicle;
    determining, based at least in part on the second map, a second series of poses of the vehicle in the environment;
    determining a difference between the first series of poses and the second series of poses; and
    updating the first series of poses based at least in part on at least one of:
        the second series of poses; or
        the difference between the first series of poses and the second series of poses; and
    controlling the vehicle based at least in part on the updated series of poses.

6. A method as claimed in claim 5, wherein determining the second series of poses comprises integrating odometry measurements between a first voxel space associated with a first pose of the second series of poses and a second voxel space associated with a second pose of the second series of poses.

7. A method as claimed in claim 5, wherein determining the difference comprises determining, as a transformation, one or more of a translation or rotation between the first map and the second map.

8. A method as claimed in claim 5, further comprising:
identifying, as a first condition, that the difference exceeds a predetermined threshold; or
determining at least one additional difference between the first series of poses and the second series of poses and identifying, as a second condition, a structure of the difference and the at least one additional difference; and
updating the first map based at least in part on either the first or second conditions.

9. A method as claimed in claim 5, wherein the sensor data comprises LIDAR data, and wherein the second map is created at a higher frequency than a refresh rate of the first map.

10. A method as claimed in claim 5 further comprising:
determining a portion of the sensor data associated with a dynamic object proximate the vehicle in the environment,
wherein determining the second map comprises determining the second map data at the exclusion of the portion.

11. A method as claimed in claim 5, further comprising:
determining that the difference between the first series of poses and the second series of poses exceeds a predetermined threshold and, in response to the determination, controlling the vehicle based at least in part on the second map.

12. A method as claimed in claim 5, further comprising applying a recursive filter to the second series of poses.

13. One or more non-transitory computer-readable media storing instructions executable by one or more processors of a system, wherein the instructions, when executed, cause the one or more processors to perform operations comprising:
receiving a first map;
receiving sensor data from a sensor;
determining, based at least in part on the sensor data and the first map, a first series of poses of a vehicle in an environment;
determining, based at least in part on the position and the sensor data, a first trajectory for the vehicle to follow;
associating, as a second map, the sensor data with a voxel space comprising a plurality of voxels, the voxel space indicative of a discretized three-dimensional portion of the environment proximate the vehicle;
determining, based at least in part on the second map, a second series of poses of the vehicle in the environment;
determining a difference between the first series of poses and the second series of poses;
updating the first series of poses; and
controlling the vehicle based at least in part on the updated series of poses.

14. One or more non-transitory computer-readable media as claimed in claim 13, wherein determining the second series of poses comprises integrating odometry measurements between a first voxel space associated with a first pose of the second series of poses and a second voxel space associated with a second pose of the second series of poses.

15. One or more non-transitory computer-readable media as claimed in claim 13, wherein determining the difference comprises determining, as a transformation, one or more of a translation or rotation between the first map and the second map.

16. One or more non-transitory computer-readable media as claimed in claim 13, the operations further comprising:
identifying, as a first condition, that the difference exceeds a predetermined threshold; or
determining at least one additional difference between the first series of poses and the second series of poses and identifying, as a second condition, a structure of the difference and the at least one additional difference; and
updating the first map based at least in part on either the first or second conditions.

17. One or more non-transitory computer readable media as claimed in claim 13, wherein the sensor data comprises LIDAR data.

18. One or more non-transitory computer-readable media as claimed in claim 13, wherein the operations further comprise applying a filter to the second series of poses of the vehicle in the environment.

19. One or more non-transitory computer-readable media as claimed in claim 18, wherein the filter comprises a recursive filter.

20. One or more non-transitory computer-readable media as claimed in claim 18, wherein the operations further comprise determining a first portion of the sensor data associated with a dynamic object, and
wherein associating the sensor data comprises associating a second portion of the sensor data excluding the first portion.

* * * * *